United States Patent
Nerger et al.

[11] Patent Number: 5,795,003
[45] Date of Patent: Aug. 18, 1998

[54] APPARATUS FOR GRIPPING AND WEIGHT-DIFFERENT CLAMPING OF WORKPIECES, BAR GUIDES AND THE LIKE TO BE HELD OR MOVED RELATIVE TO A LOCATION

[75] Inventors: Klaus Klemens Nerger, Neukirchen-Vluyn; Josef Saeftel, Castrop-Rauxel, both of Germany

[73] Assignee: Mannesmann Aktiengesellschaft, Dusseldorf, Germany

[21] Appl. No.: 672,079

[22] Filed: Jun. 26, 1996

[30] Foreign Application Priority Data

Jun. 28, 1995 [DE] Germany .................. 195 25 018.4

[51] Int. Cl.⁶ .................................................. B66C 1/42
[52] U.S. Cl. .................... 294/106; 294/110.1; 294/117; 414/917
[58] Field of Search .................. 294/110.1, 110.2, 294/106, 115, 117, 118, 81.51, 81.61; 414/917

[56] References Cited

U.S. PATENT DOCUMENTS

| | | |
|---|---|---|
| 2,610,890 | 9/1952 | Jaeger .................. 294/110.1 |
| 2,743,954 | 5/1956 | Ostlund ................. 294/110.1 |
| 3,069,761 | 12/1962 | Sommer ................. 294/106 |
| 4,133,570 | 1/1979 | Hammink et al. ....... 294/110.1 |
| 4,709,953 | 12/1987 | Sirota .................. 294/106 |

FOREIGN PATENT DOCUMENTS

| | | | |
|---|---|---|---|
| 5-69371 | 3/1993 | Japan ................... 294/106 |
| 2148845 | 6/1985 | United Kingdom ........ 294/110.1 |

Primary Examiner—Dean Kramer
Attorney, Agent, or Firm—Cohen, Pontani, Lieberman, Pavane

[57] ABSTRACT

An apparatus for gripping and weight-dependent clamping of workpieces, bar guides and the like that are to be held or moved relative to a location, particularly in connection with a hand-guided handling device that has a control switch. The apparatus includes a carrying frame to which are linked upper hinge-bolt pairs for respective superimposed pairs of parallel rods, which are detachably attached by pairs of lower hinge-bolts to a connection piece for gripping elements. A pair of struts, each of which is linked to one lower hinge-bolt, is jointly attached in articulated fashion to a control bolt centrally adjustable between the rods in a guide slot on the carrying frame.

29 Claims, 10 Drawing Sheets

Fig. 10
Fig. 11
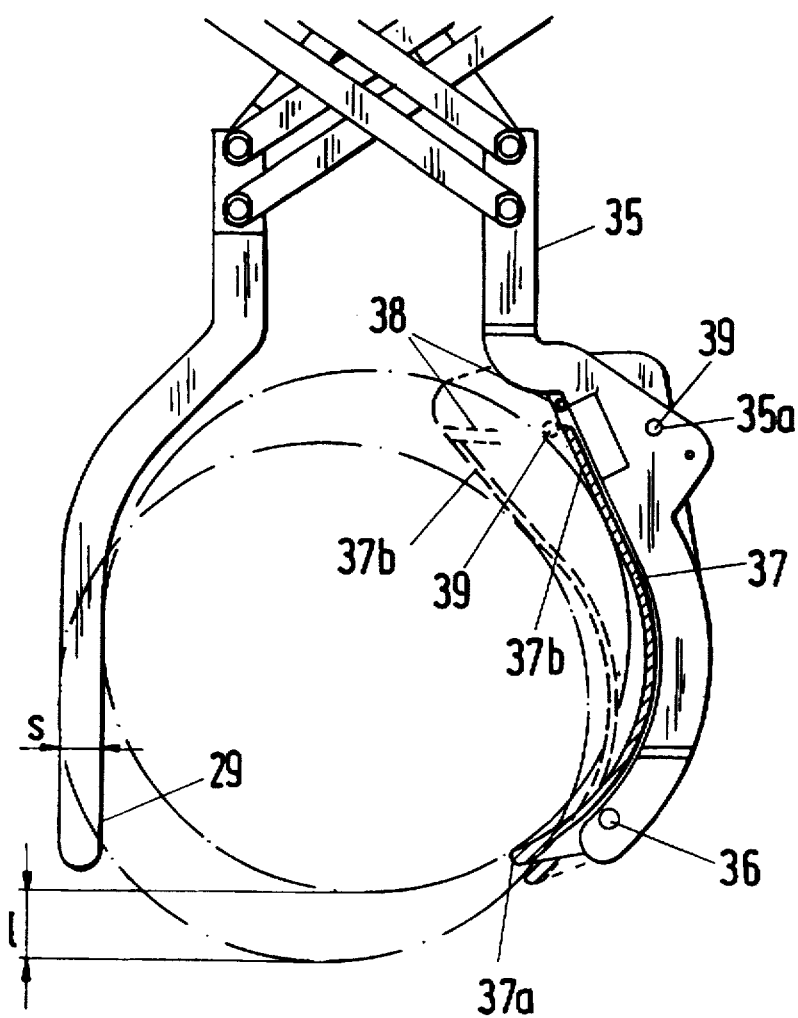
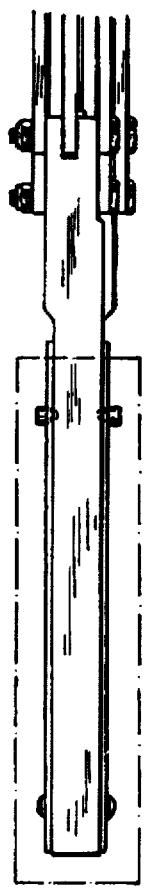

APPARATUS FOR GRIPPING AND WEIGHT-DIFFERENT CLAMPING OF WORKPIECES, BAR GUIDES AND THE LIKE TO BE HELD OR MOVED RELATIVE TO A LOCATION

BACKGROUND OF THE INVENTION

1. Field of the Invention

The invention relates to an apparatus for gripping and weight-dependent clamping of workpieces, bar guides and the like that are to be held or moved relative to a location, in connection with a hand-guided handling device.

2. Description of the Related Art

The device mentioned above is known from German Gebrauchsmuster G 91 03 520.1. The gripping elements mentioned in that document consist of semicircularly-curved gripping arms with a toggle lever system as well as circuit boards arranged centrally between the rods for controlling the movement of the gripping arms. However, the known device is designed as an incremental switch device, which allows intermediate off-loading as a switching stick is moved on a control cam and, in this way, the gripping arms are opened, closed, kept open or kept closed. The gripping arms can be kept open only in a certain position and according to a pre-established cycle.

In order to grip disks, it is known to slip the required lifting hooks under a vertically-standing workpiece, e.g., a circular disk, from one side. When the lifting hook is raised, the workpiece rests upon two studs on the hook. However, lifting hooks of this type are ill-suited for use when disks of various sizes must be gripped or when disks must be processed in machine tools in two settings. After a disk has been removed by such a lifting hook following a first setting, it must then be set down and picked up again from the other side, because the lifting hook will always cover one side of the disk. Only after being turned in the machine tool can the workpiece be set up anew.

During the use of conventional grippers that close automatically because of the load, problems arise in that the structural height of loaded grippers—and even that of unloaded grippers—is very great. This great structural height makes it difficult to operate a control switch located above the grippers while travelling over obstacles. It also reduces the possible stack height, compared to that possible with flatly-designed grippers. Furthermore, when subjected to a load, the gripping elements of conventional grippers always tend to close further, until they reach a maximum position. If it is impossible for them to reach this position, due to workpiece geometry, then those workpieces without form-stability undergo additional extensive secondary bending. In the case of plastic containers, this secondary bending quickly leads to damage at the grip points. It is also disadvantageous that loads arranged movably in containers may tend to tilt and may thus fall out. Furthermore, many inner-gripping grippers extend over the container edge, so that these containers cannot be stacked close together. Finally, it is disadvantageous that the known gripper elements lack suitable centering elements that would permit quick placement of the grippers on the containers or, when grippers are lifted off containers at a slant, would prevent gripper parts from getting caught on the container.

SUMMARY OF THE INVENTION

Accordingly, it is an object of the present invention to provide a device for gripping and weight dependent clamping so that, while eliminating the described disadvantages, it is unnecessary for workpieces of various sizes to be set down and picked up again between two settings when there is only limited lateral free space. It is a further object to create a compact device which permits the gripper elements to be adjusted to workpieces of various shapes and types. In addition, it is to be possible to fix the gripping arms in place over the entire lifting area in order to avoid injuries while manipulating the gripping arms by hand.

Pursuant to these objects, and others which will become apparent hereafter, one aspect of the present invention resides in a device as described above having a carrying frame, to which upper hinge-bolt pairs for respective superimposed pairs of parallel rods are linked. The rods are detachably linked by pairs of lower hinge-bolts to a connection piece for gripping elements. A pair of struts, each respective strut of which is linked to one lower hinge-bolt, is jointly attached in articulated fashion to a control bolt, which is centrally adjustable between the rods in a guide slot on the carrying frame. Such a basic module permits the use of internal-gripping and external-gripping parts for a wide variety of workpiece shapes and types. The device can thus be adjusted to the particular material to be conveyed.

In addition, special advantages of the basic module include very high levels of work safety and operating convenience as well as a compact design with relatively great lift. It is always possible to open the device by placing it on material to be conveyed and to keep the device open in any desired position, after removal of a set-down workpiece, by operating an operating element. This eliminates a significant risk of injury that exists when known shear grippers are used. The standard shear grippers lock into place only in the completely open position and must sometimes be manipulated by hand, even for the purpose of opening closed grippers or keeping the grippers open in an intermediate position. The small structural height of the device according to the invention, compared to known shear grippers, as well as its compact lateral dimensions, reduce the "dead measure" of the handling device, make it easier to operate the control switch while travelling over obstacles, and permit handling under cramped conditions in the machine free space, in containers and with densely stacked material to be conveyed.

According to a further embodiment of the invention, outside of the carrying frame there is a quick-change mechanism with a coupling neck, which can be coupled into a receptacle of a control switch. A quick-change mechanism of this type has the advantage of creating a connection to a hand-held handling device that has a control switch, so that the gripping device can be guided and operated in a controlled manner.

In another embodiment of the invention, a handle with an operating lever is attached to the carrying frame. As a result, the device can be handled and controlled with one hand.

In still another embodiment of the invention, the distance between the gripping elements in their end positions can be established by means of the length and position of the guide slot. The difference between the maximum and the minimum distance of the gripping elements to one another constitutes the lift of the gripping device. The half-lift is the lift per gripping element. When travelling through the lift, the gripping elements always remain parallel to one another.

In a further embodiment of the invention, the control means arranged centrally between the rods is a locking mechanism. In contrast to the prior art, the invention therefore does not use an incremental switch device, but rather a locking mechanism. Furthermore, an advantage of the invention is that the control bolt can be set by means of the locking mechanism into a plurality of positions. For this purpose, a suitable clamping mechanism can be blocked or locked in a positive-locking manner in a very fine grid.

In detail, the invention calls for the following measures: The control bolt is connected to the block so as to permit a slight crosswise movement of the block. The block is provided on the outside with fine toothing in the direction of the guide slot, and similar toothing, running parallel to the toothing on the block, is provided on a rod attached to the carrying frame. The plurality of positions of the locking mechanism can thus be influenced by the number of teeth in the toothing.

According to other features of the invention, the block to hold the control bolt itself forms a guide slot, which is vertical or crosswise relative to the course of the guide slot. The distance travelled by the block on the control bolt is then slightly greater than the meshing area of the teeth, in order to permit clicking-in and clicking-out.

Furthermore, spring-mounted clamping bolts are arranged in pairs in the block at a right angle to the course of the guide slot, in order to decouple the block from the toothing.

In an advantageous embodiment, a level glide surface is arranged on the rod parallel to the toothing so that the glide surface constitutes a guide.

In a further embodiment of the invention, a saddle-type part is arranged on the carrying frame in a longitudinally movable fashion and is connected to a leg. The leg has slots which run obliquely upward, and through which guide bolts that are attached to the carrying frame run. When the saddle-type part is lifted up from the carrying frame, the back-slanted position of these slots causes the leg to move the block with toothing—against the force of the spring-mounted clamping bolts and independent of the position of the control bolt—into engagement with the toothed rod.

Other features of the invention provide that when no load is present, the saddle-like part and the legs unlock the control bolt by means of tension springs arranged in pairs. The tension springs ensure that when the device is not subjected to any load, the saddle-like part is always drawn into the position in which the control bolt is unlocked.

According to another feature of the invention, the path of the saddle-like part is limited by means of carrying screws. These turn-proof carrying screws constitute the displacement path and the power transmission from the carrying frame via the saddle-like part onto the coupling neck to the handling device.

In another embodiment, the locking mechanism can be manually activated by means of a handle and an operating lever. This occurs as follows: The operating lever is swingably mounted around a rotational axis on the carrying frame and has a take-along pin, which runs via a slot in a slider, which is also movably mounted on the carrying frame, via slots running obliquely upward. This permits the device to be operated and controlled with one hand and, as needed, the locking mechanism to be activated not only by means of a load, but also by hand.

The required functions are achieved by virtue of the fact that the slider is run in a movable fashion relative to the carrying frame, by means of the bolts.

In order to prevent the device from opening during inadvertent impact with the load or if the device is set down during transport, a leaf spring is attached to the saddle-type part, which rests by a heel on the operating lever.

The set position is secured as follows by an external lever arm of the operating lever that can be arrested by means of a spring-mounted sphere on the rod.

Advantageously, the workpieces are gripped, according to the type of workpiece, by gripping elements that are provided either with a rigid gripping prism or with a self-adjusting gripping prism.

A related embodiment has proved outstanding in this respect, because the self-adjusting gripping prism has an external part with a load support attached at the end and a hold-down appliance, located approximately opposite to the load support, with a holding means, whereby the holding means is run movably on the bars and accommodates the hold-down appliance by means of studs arranged in bores. The contact surface can be formed so that the hold-down device is adjusted over the entire lift of the particular gripped workpiece.

Furthermore, an external part has a glide foot, which is equipped with a anti-slip cover and a separate shoulder for quick opening upon lowering. This provides the glide foot with a great advantage, namely, that even workpieces stacked relatively close together can be gripped without first being separated manually.

The lifting capacity of the device can be increased by equipping an external part with an auxiliary load support, which has a holding protrusion directed toward the workpiece.

Heavier workpieces often have asymmetrical load distribution. In addition, in some cases, there are sharp diameter discontinuities on the workpieces.

For disk-shaped workpieces it is especially advantageous that a gripper element consists of a gripper arm, on which a clamping prism is mounted in a spring-mounted and back-swingable fashion around a bolt at the end of the gripping arm.

Picking up special workpieces that are stacked or located next to one another often entails specific considerations. For workpieces arranged in this manner, each gripping element has an external spline boring located opposite to the hinge-bolt. An external spline runs in each external spline boring, and a support jaw and/or at least one lifting hook are arranged on the external spline. Support jaws and lifting hooks are thus easily exchangeable and can be shaped or designed accordingly.

In this respect, it is also advantageous that the gripping elements for closely stacked workpieces consist of a lifting hook with an angled arm and are mounted pivotally on the external spline, while means to limit the swinging movement and means to prevent an axial movement are provided. For example, the angled arm can be placed on the perimeter of a support jaw, and the means for limiting the swinging movement can consist of pins and the like.

It is also possible to utilize the lift of the "basic module" in a limited fashion. To this end, the gripping elements consist of gripping strips adjustable relative to one another on a plane, both of which are connected to the connection pieces via hinge-bolts and accommodate a centering frame. The device in this form is especially suitable for containers with gripping areas into which the device engages.

In order to ensure that workpieces of the container type are gripped evenly, centering levers are pivotally mounted on the respective end areas of the centering frame and are secured against axial movement.

In order to allow universal use of the device and also to permit the device to be used in the form of a folding undercarriage, a roller holder with rotatably mounted running rollers is attached to the connection pieces. The device can then be used in reverse of its normal position, in the area of bar guides and the like.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 10 is an alternative embodiment for disk-shaped workpieces;

FIG. 11 is a side view of FIG. 10;

DETAILED DESCRIPTION OF THE PREFERRED EMBODIMENTS

Figure 1:
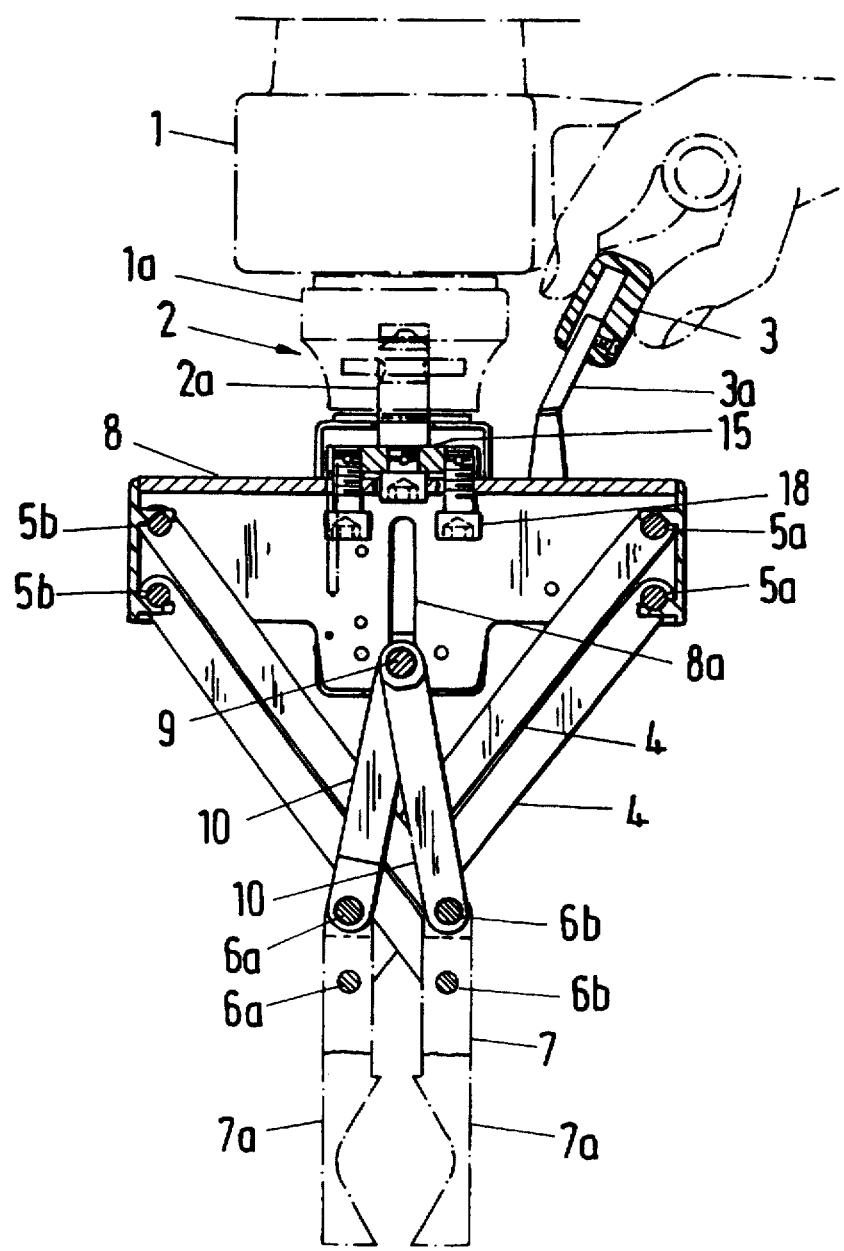
FIG. 1 is a front view of the inventive apparatus, in partial section.

In FIG. 1, the apparatus for the gripping and weight-dependent clamping of workpieces is shown in connection with a hand-guided handling device, which has a control switch 1, which is connected via a quick-change mechanism 2 to a coupling neck 2a in a receptacle 1a. The control switch 1 of the handling device can be connected to the handling device via a rigid guide, a chain, a cable or the like, and signal lines. However, the device can also be connected directly to a carrying system (traction means) of the handling device, and the control switch 1. can be arranged separately.

The arrangement shown in FIG. 1 is advantageous because it is possible to operate the handling device and the inventive apparatus and to guide a load quickly and safely with one hand. The other hand of the operator is free to carry out other activities.

Figure 3:
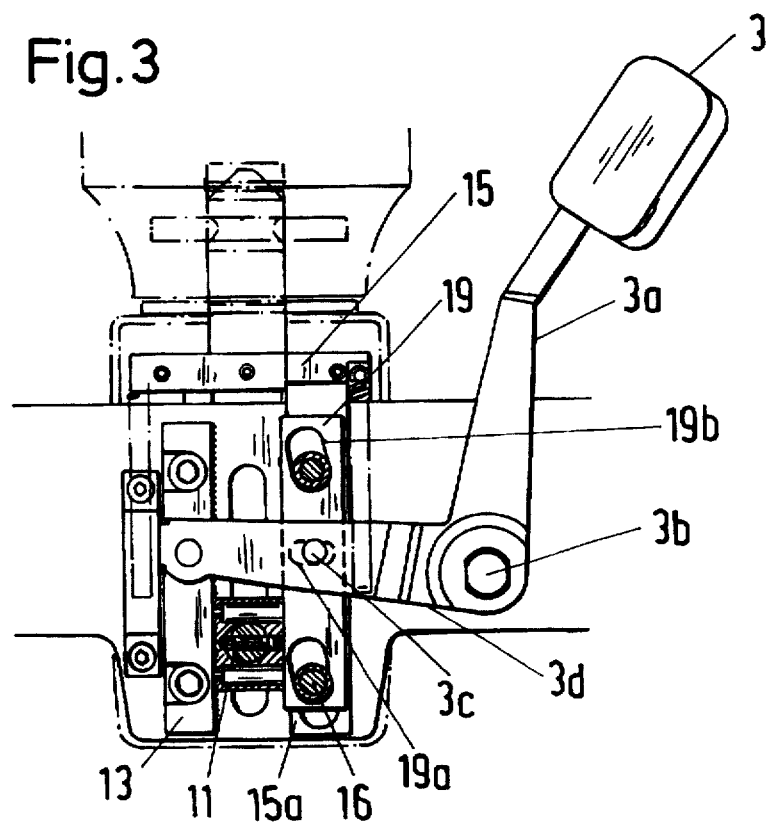
FIG. 3 shows the locking mechanism as in FIG. 2, seen in connection with a handle.

The inventive apparatus includes a handle 3 as an operating element with an operating lever 3a, which can be swung around a rotational axis 3b (FIG. 3).

The apparatus (FIGS. 1 to 5) is basically comprised of a basic module, which consists of the aforementioned handle 3 as the operating element, a locking mechanism 12, and a lever system for any desired mountable and quickly exchangeable gripping elements 7a.

This so-called basic module has adjacent pairs of parallel rods 4, which are attached by means of upper hinge-bolt pairs 5a, 5b to a carrying frame 8. The parallel rods 4 are detachably attached by pairs of lower hinge-bolts 6a, 6b to a connection piece 7 for the aforementioned gripping elements 7a, and a pair of struts 10. Each strut is attached to one lower hinge-bolt 6a or 6b and is jointly connected in articulated fashion to a control bolt 9 that is centrally adjustable between the rods 4 in a guide slot 8a of the carrying frame 8. In a sense, the lower hinge-bolts 6a, 6b represent an interface between the so-called basic module and the gripping elements 7a. The path travelled by the control bolt 9 also determines the particular distance between the gripping elements 7a, so it is possible to determine the spacing of the gripping elements 7a relative to one another in their end positions by means of the length and position of guide slot 8a.

According to FIG. 1, the control bolt 9 is located at its lower end stop. Thus, the gripping elements 7a also assume their lowest position and are therefore located at their minimum distance from one another. In contrast, the upper end of the guide slot 8a limits the maximum distance of the gripping elements 7a. As this happens, the distance between the gripping elements 7a and the carrying frame 8 is also reduced. The difference between the maximum and the minimum distance of the gripping elements 7a (or of the lower hinge-bolts 6a and 6b) relative to one another constitutes the lift of the device. The half-lift of the device is thus created per gripping element 7a.

When travelling through this lift, the position of the gripping elements 7a relative to one another always remains parallel. In the event that the control bolt 9 becomes blocked in an intermediate position in the guide slot 8a, the two gripping elements 7a are also fixed in place in a certain position. However, universal applicability of the device is achieved when the gripping elements 7a can be fixed in placed not only in one particular position, but in a plurality of positions, whereby the control bolt 9 can be arrested by means of t h e locking mechanism 12 in this plurality of positions.

Figure 2:
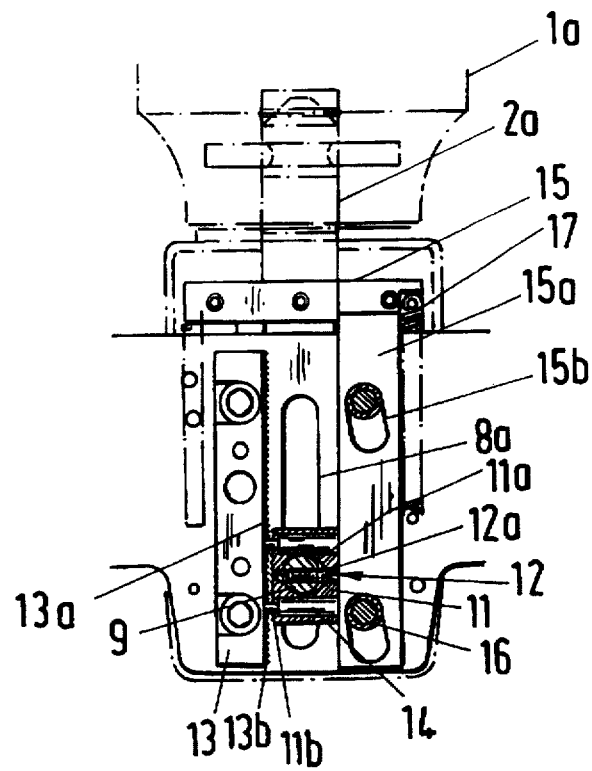
FIG. 2 is a front view of the locking mechanism.

In FIG. 2, the locking mechanism 12 is shown in greater detail. The control bolt 9 extends into a block 11 with a crosswise guide slot 11a. A pin 12a of the locking mechanism 12 connects the block 11 in this direction with the control bolt 9 so that the block 11 cannot move axially relative to the control bolt 9, but can move relative to the control bolt 9 at a right angle to the guide slot 8a of the carrying frame 8. Parallel to the guide slot 8a, and extending over the entire path travelled by the control bolt 9 in the guide slot 8a of the carrying frame 8, there is a bar 13, which has teeth 13b corresponding to teeth 11b on the block 11. The ba r 13 is positioned so that when the block 11 moves toward the toothed bar 13 with the mating-teeth 13b, the teeth 11b on block 11 engage with the toothed bar 13. The distance travelled by the block 11 on the control bolt 9 is slightly greater than the meshing area of the teeth. In the toothed block 11, there are also spring-mounted clamping bolts 14, which press the block 11 away from the toothed bar 13. For this purpose, a level glide surface 13a is provided on the bar 13 in front of the teeth 13b. The engagement of the teeth 11b and 13b is carried out via a saddle-like part 15, which is arranged movably on the carrying frame 8.

The saddle-like part 15 has a leg 15a with obliquely arranged slots 15b. The slots 15b guide the saddle-like part 15 via bolts 16, which are firmly attached to the carrying frame 8. When the saddle-like part 15 is lifted up from the carrying frame 8, the slanted position of the slots 15b causes the leg 15a to bring the toothed block 11 into engagement with the toothed bar 13, against the force of the spring-mounted clamping bolt 14, regardless of the position of the control bolt 9. Furthermore, when the apparatus is not subjected to any load, tension springs 17 cause the saddle-like part 15 to always be drawn into the position in which the control bolt 9 is unlocked.

The coupling neck 2a, as shown in FIG. 1, is attached securely to the top side of the saddle-like part 15. In the event that the saddle-like part 15 is lifted up from the carrying frame 8, against the force of the tension springs 17, turn-proof carrying screws 18 (FIG. 1) limit the distance travelled and establish a transmission of power from the carrying frame 8 via the saddle-like part 15 onto the coupling neck 2a to the handling device or its control switch 1. The power relationships of the rods 4 arranged in the form of a parallelogram are designed so that the apparatus is self-closing, even without a locking mechanism 12, when prismatic-type gripping elements 7a are used. The weight of the goods to be conveyed, which acts centrally on the gripping elements 7a, causes the apparatus to close. Loads gripped outside of their center of gravity, e.g., shafts, act (beginning with a certain asymmetry) on the apparatus in a levering manner. To ensure that the apparatus then does not open unintentionally, the locking mechanism 12 is activated. However, the locking mechanism 12 is also used in order to prevent the opened apparatus from closing again when a load is set down. In this situation, the lock is activated via the handle 3 and the operating lever 3a. In FIG. 3, the operating lever 3a is swingably attached to the carrying frame 8 by the rotational axis 3b and has a take-along pin 3c on an outer lever arm 3d. The take-along pin 3c extends into a slot 19a of a slider 19. The slider 19 is comparable to the saddle-like part 15 that runs movably on the bolts 16. The slider 19 has slots 19b arranged at a slant, similar to those of the leg 15a. In the position shown in FIG. 3, the slider 19 brings the toothed block 11 into engagement with the toothed bar 13 and prevents the empty apparatus from closing. To release this lock, the handle 3 is swung in the direction of the control switch 1, so that the slider 19 is brought into a congruent position with the leg 15a. As a result, the block 11 again reaches the position shown in FIG. 2, the apparatus finds itself in the unlocked position, and the gripping elements 7a close.

Figure 4:
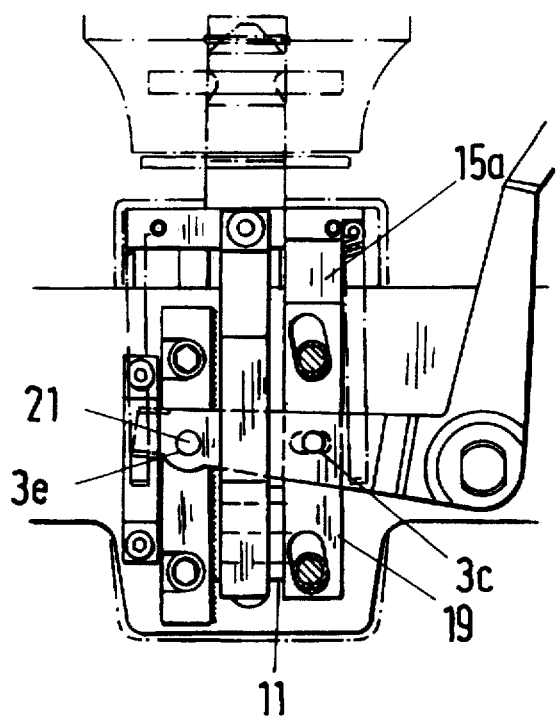
FIG. 4 is a view as in FIGS. 2 and 3, in connection with a leaf spring.
Figure 4A:
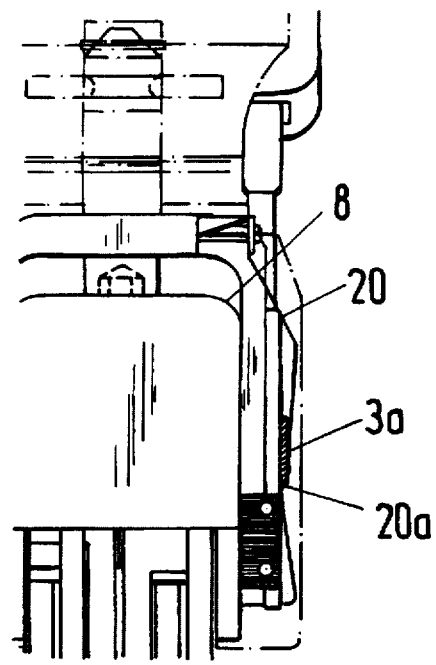
FIG. 4a is a side view of FIG. 4.
Figure 5:
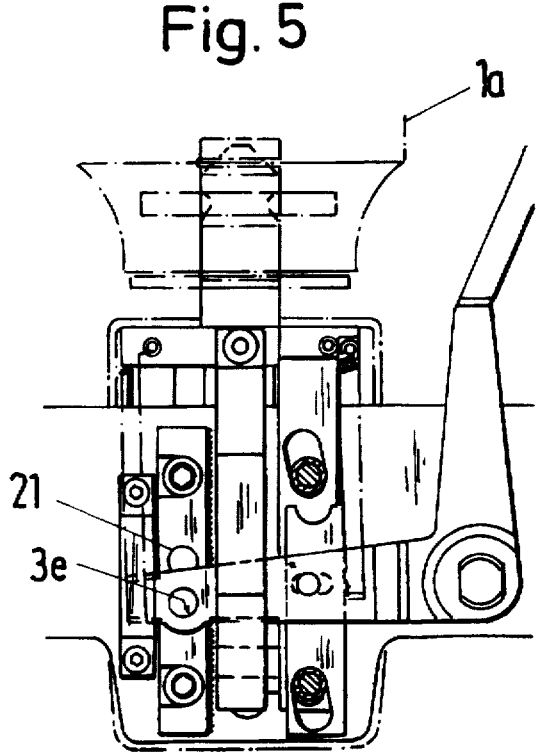
FIG. 5 is a view as in FIG. 4, with the hand lever in a different position.
Figure 5A:
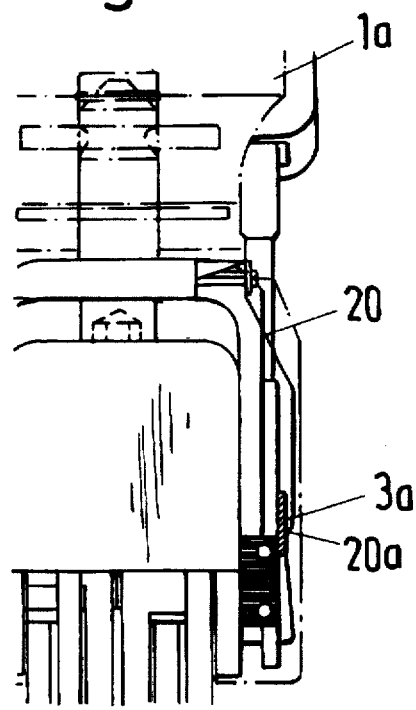
FIG. 5a is a side view of FIG. 5.

A further function of the locking mechanism 12 is to prevent the apparatus from opening during transport if there is an unintentional impact on the load or if the load is set down. This function is shown in FIGS. 4, 3a, 5 and 5a. A leaf spring 20 with a heel 20a is attached to the saddle-like part 15 so that the heel 20a extends under the outer lever arm 3d. If, when the load is picked up by the apparatus (as shown in FIGS. 4 and 4a), the saddle-like part 15 is lifted up from the carrying frame 8, then the operating lever 3a is also swung up above the heel 20a. In this position, a sphere 21 is pressed by a spring (not shown) arranged in the back into a bore 3e of the outer lever arm 3d and, as a result, arrests the outer lever arm 3d. In this position, the block 11 is pressed by both the leg 15a and the slider 19 toward the toothed bar 13. In the event that while the apparatus is being handled, the gripped workpiece or the gripping elements 7a are unintentionally placed on an obstacle, the saddle-like part 15 again moves into the position shown in FIG. 2. The leaf spring 20 is thereby pushed downward, while the operating lever 3a, remains in its arrested position over the sphere 21. As a result, the apparatus is not able to open and the workpiece cannot be lost. In the event that the workpiece, in another case, is intentionally set down, the operator is able, using slight manual force, to swing the handle 3 in the direction of the control switch 1 against the resistance of the sphere 21, in order to open the apparatus. It is also possible, however, to release the arrest of the operating lever 3a when the load is still suspended in the apparatus and the grippers have not yet been put down. This case is shown in FIG. 5. The apparatus then does not open until it is next put down. The operating lever 3a is hereby swung downward against the resistance of the leaf springs 20 from the heel 20a. Releasing the arrest in this fashion while a load is still suspended permits the operator to put down and open the apparatus without an intermediate stop. However, the release of the apparatus while the load is still suspended can also be rescinded at any time by activating the operating lever 3a. The apparatus then remains locked until the operator deliberately activates the handle 3, with a suspended load or a set-down load. Each function of the apparatus is immediately available, without a fixed cycle having to be followed.

In some applications, however, it may not be possible to release the lock while the load is still suspended. In these cases, the leaf springs 20 are replaced by a rigid take-along means which, like the heel 20a, grip under the operating lever 3a. However, the operating lever 3a can then no longer be used when the saddle-like part 15 is lifted up.

Figure 6:
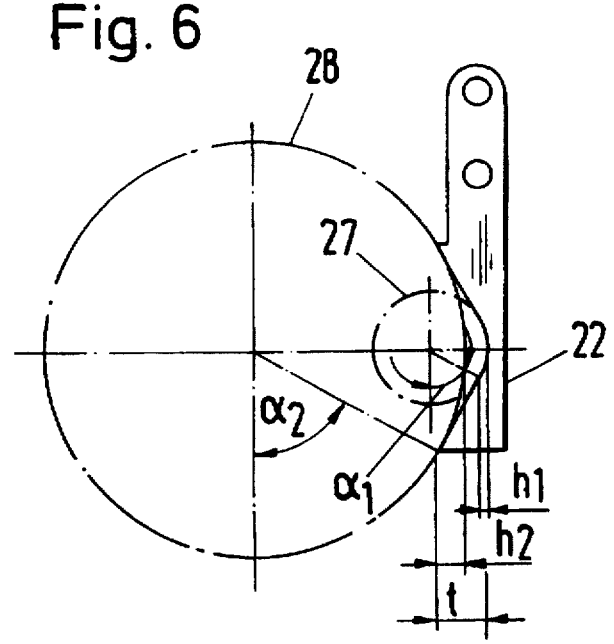
FIG. 6 is a round workpiece with a rigid gripping prism, in front view.
Figure 7:
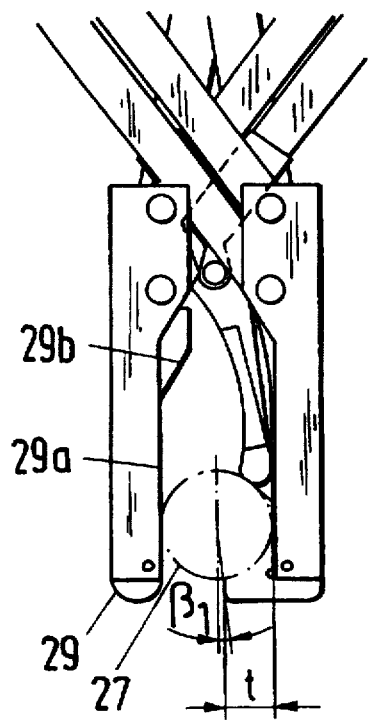
FIG. 7 is a front view of the gripping elements, with a self-adjusting adjustment prism.
Figure 7A:
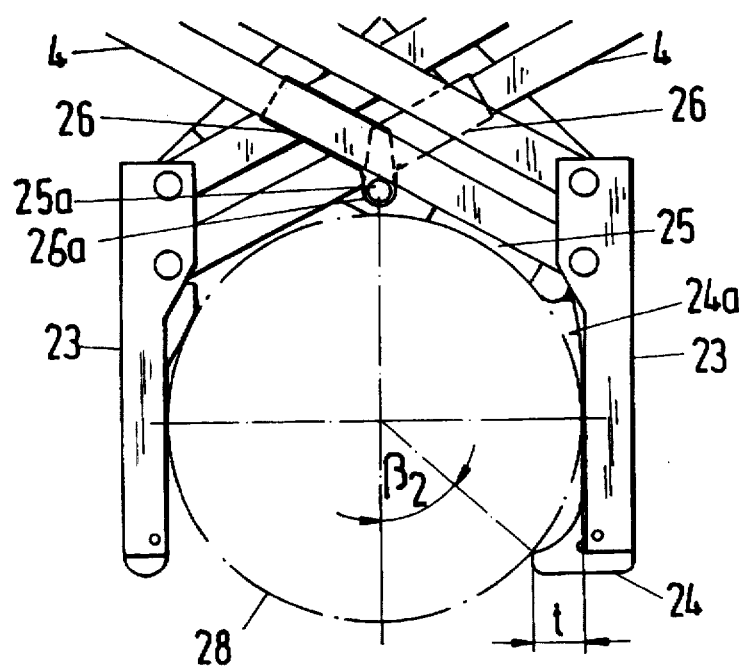
FIG. 7a is the same view as in FIG. 7 for a workpiece of larger diameter.

The gripping elements 7a are exchangeable at the interface (lower hinge-bolts 6a, 6b) on the so-called basic module. In contrast to the gripping element 7a with a rigid gripping prism 22 shown in FIG. 6, the embodiments in FIG. 7 and 7a show a gripping element with a self-adjusting adjustment prism. For the sake of better comparison, the depths "t" of the gripping prism 22 are identical. However, the effective areas of congruence between the gripping prism 22 and the indicated workpieces 27 and 28, "h1" and "h2", are smaller than "t". But the subject-matter shown in FIGS. 7 and 7a presupposes the amount "t" as the effective congruence. For this reason, the angular deviations β1 and β2 between the active lines of the weights of the workpieces 27 and 28 and the support forces on the gripping prism 22 are always smaller than the angular deviations α1 and α2 as in FIG. 6. As a result, using an adjustable gripping prism 22 with the same workpiece weight, lesser support forces are required; or, when the load capacity of the gripping prisms 22 is equal, higher workpiece weights are permissible than with the rigid gripping prism 22. A further advantage of the self-adjusting gripping prism 22 is that the gripping elements 7a for small workpieces do not extend out so far under the workpiece. The workpieces 27, 28 can thus also be handled even when there is less ground clearance.

The adjustable gripping prism 22 consists of an outer part 23 of a load support 24, a hold-down appliance 25, and holders 26. The holders 26 are run movably on the rods 4 and accommodate the hold-down appliance 25 on studs 25a in bores 26a in swingable fashion. In addition, the hold-down appliance 25 is run on the load support 24 so that the hold-down appliance 25 is always in contact with a contact area 23a and is adjusted over the entire lift to the diameter of a workpiece 27, 28, which lies on the contact area 23a. Because the basic module automatically locks the apparatus when a load is picked up, the hold-down appliance 25 is able to support itself directly via the studs 25a under the rods 4 when the workpieces 27, 28 tilt, without the apparatus opening.

Figure 8:
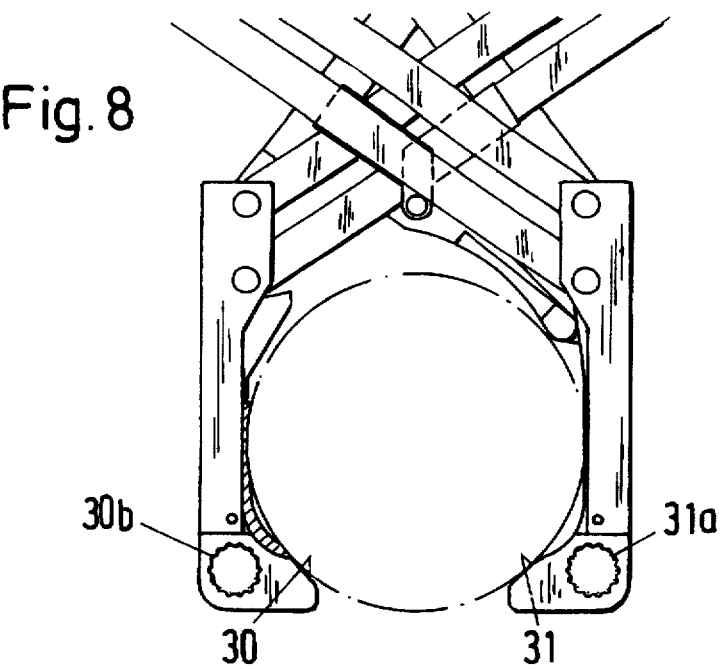
FIG. 8 shows an embodiment for heavy workpieces with a second load support.
Figure 8A:
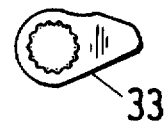
FIG. 8a is a detail of a support jaw with external spline boring.
Figure 8B:
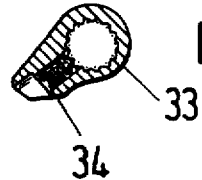
FIG. 8b is a cross-section through the support jaws of FIG. 8a, as a detail.
Figure 9:
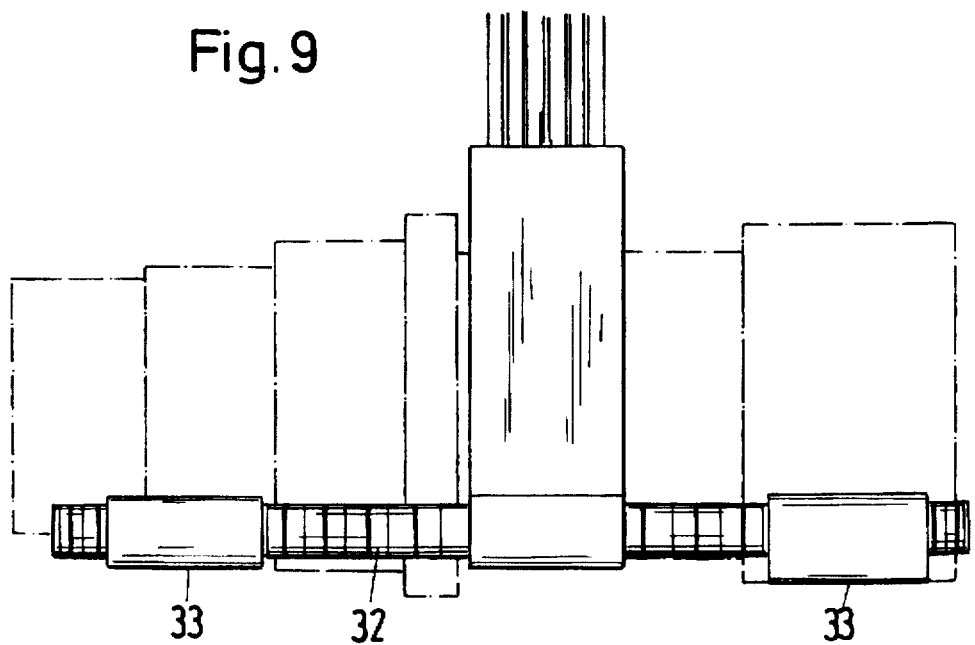
FIG. 9 is a front view of a stepped shaft with the gripping device.

To safely manipulate the workpieces 27, 28, it is sufficient for the apparatus to be equipped with only one adjustable gripping prism 22. On the second side, the outer part 23 is combined with a glide foot 29. The glide foot 29 has an anti-slip cover 29a to prevent axial movement of the workpieces 27, 28 as well as a shoulder 29b for quicker opening of the apparatus when it is lowered onto the workpiece 27, 28. However, in the case of heavy workpieces, it is also possible to replace the glide foot 29 with an auxiliary load support 30, as shown in FIG. 8. In this way, the permissible carrying load of the apparatus is doubled, compared to the embodiment with a glide foot 29. In addition, heavier workpieces 27, 28 also frequently have an asymmetrical load distribution. Considerable diameter discontinuities are experienced, as shown in FIG. 9. With conventional grippers, it is often possible to grip such workpieces 27, 28 only in a very disadvantageous manner. This occurs particularly when a shaft-workpiece must be placed in a tooling machine or when, in order to avoid axial slippage, suspension in the apparatus must be as horizontal as possible. For this reason, a load support 31 and the auxiliary load support 30 have external spline bores 31a, 30b with external splines. These external spline bores 31a, 30b serve to accommodate corresponding external splines 32. At the free end of the external splines 32, as needed, additional supporting jaws 33 can be positioned in such a manner that the asymmetrical workpiece 27, 28 rests at the desired positions. Because the points needed for support of a workpiece 27, 28 can also have different diameters, the supporting jaws 33 are staggered in keeping with the tooth spacing as in FIG. 8a, or are slipped onto the external spline 32 in mirrored and staggered fashion in FIG. 8b. Because of the fixed tooth spacing, it is possible to adjust to certain diameter steps. When the mirrored arrangement is used, particular intermediate steps can be adjusted to. In this way, the total step discontinuities are halved. The external splines 32, however, can also be exchanged as needed for any desired workpiece-specific supporting levers. Fixing the splines 32 in place against axial slippage in the spline bores 31a, 30b, as well as fixing the supporting jaws 33 in place on the splines 32, is carried out by means of clamping screws 34, as shown in FIG. 8b.

Figure 8C:
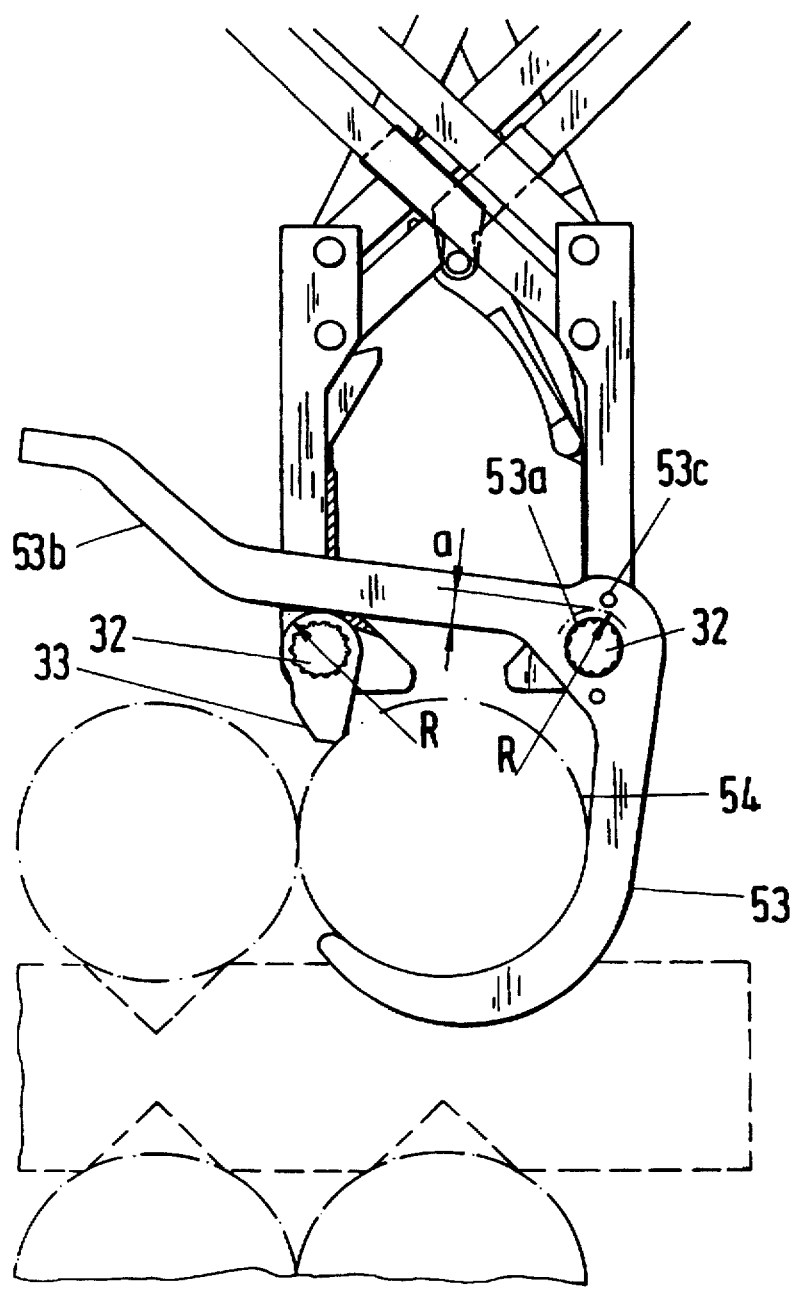
FIG. 8c shows an alternative embodiment for closely stacked workpieces.

A further alternative for handling shaft-type workpieces 27, 28 is shown in FIG. 8c. Workpieces of this type 27, 28 are frequently stacked very close together on workpiece carriers. In such cases, it is difficult to slip a gripper between two adjacent shafts. Especially in the case of long heavy workpieces 27, 28, separating the workpieces prior to gripping and putting them close together again after they have been set down is very difficult and time-consuming. For this reason, the embodiment shown in FIG. 8c contains a lifting hook 53, which is mounted rotatably by a receptacle bore 53a on the external spline 32. An angled arm 53b of the lifting hook 53 rests on the supporting jaw 33. The lifting hook 53 grips under the workpiece 27 or 28. When the apparatus is closed, the two external splines 32 move toward one another. The smaller the distance between them, the more the lifting hook 53 is swung up via the angled arm 53b. In the position shown of the supporting jaw 33, the workpiece 27, 28, i.e., a shaft 54, is clamped between the lifting hook 53 and the supporting jaw 33. As the size of distance "a" increases, the swinging distance of the lifting hook 53 increases as well, and the lifting hook 53 swings up when the apparatus is closed. When the device is in the completely open position (not shown), the distance relative to "a" is even greater, in relationship to the radius "R" in the opposite direction. Thus the lifting hook 53 swings away from the workpiece 27, 28. For safe handling, the lifting hooks 53 are used in pairs. The distance of the two lifting hooks 53 to the external spline 32 is freely selectable.

Figure 8D:
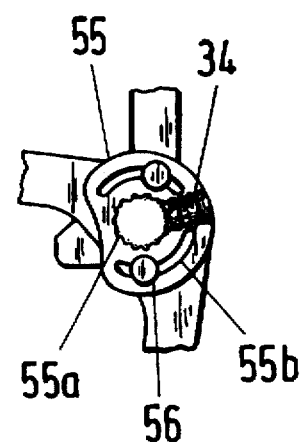
FIG. 8d is a detail with an adjustment ring.

According to FIG. 8d, an adjustment ring 55 is provided, which secures the lifting hook 53 against axial slippage on the external spline 32 and at the same time limits the swinging range of the lifting hook 53. For this purpose, the adjustment ring 55 has the same receptacle bore 55a with an external spline profile as the supporting jaw 33. Fixing the adjustment ring 55 in place on the external spline 32 is also carried out by means of a clamping screw 34. In addition, the adjustment ring 55 has two arc-shaped slots 55b. Pins 56 are run through the slots 55b, the heads of which lie in front of the adjustment ring 55, which are securely placed in bores 53c of the lifting hook 53. By moving the adjustment ring 55 on the external spline 32, it is now possible to enlarge or reduce the size of the swinging range of the lifting hook 53. In the event that the angled arm 53b of the lifting hook 53 is on the same plane as the lower, curved part, then the swinging range is limited, as shown in FIG. 8d, so that when the apparatus is opened the lifting hook 53 does not get tangled up with the supporting jaw 33. However, the lifting hook 53 can also be designed so that the angled arm 53b is set back toward the rear, relative to the lower part of the lifting hook 53. In this case, the lifting hook 53, with a somewhat shortened external spline 32, can be positioned on the left-hand side in such a way that the lower part of the lifting hook 53, when swung up, is able to swing past in front of the external spline 32 (left-hand side) and the supporting jaw 33.

Figure 8E:
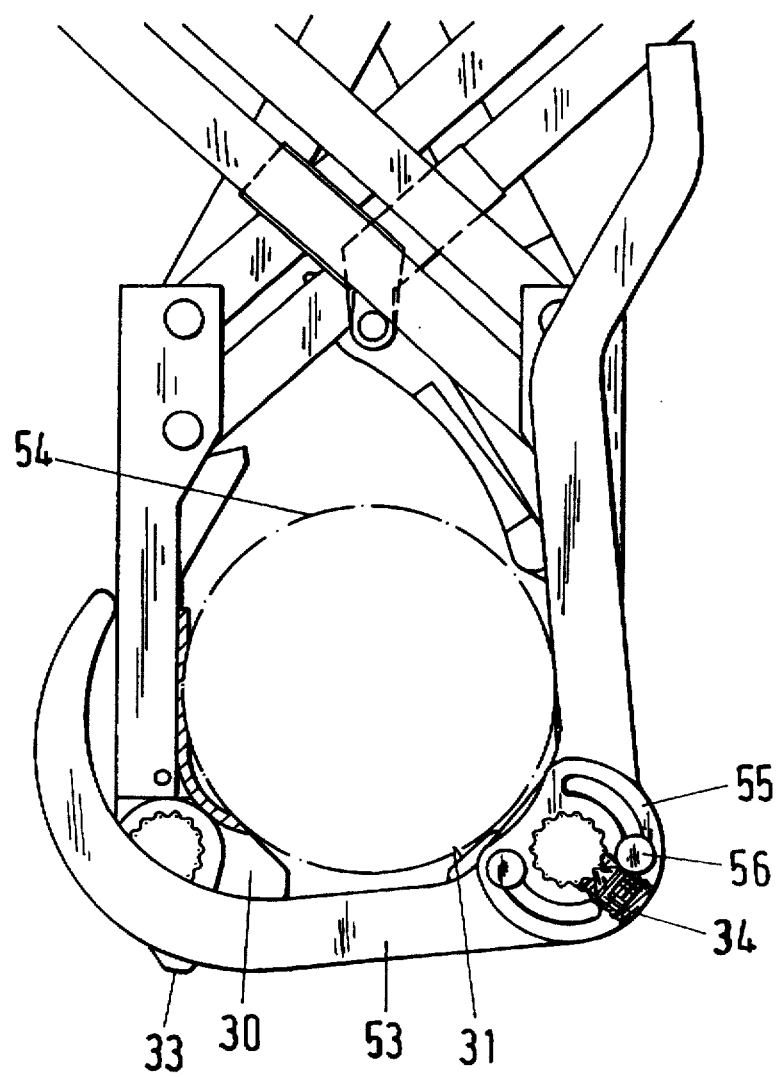
FIG. 8e shows the embodiment of FIG. 8c, in the closed position, with the lifting hook swung up and passing by the external spline and the support jaw.

This situation is shown in FIG. 8e. The swinging range changes accordingly. The adjustment ring 55 prevents the lifting hook 53 from tilting to the rear. A folding-up of the lifting hook 53 occurs in this manner when a workpiece 27, 28, i.e., a shaft 54, is picked up quite normally with the first load surface 31 and the other load surface 30. Such a procedure is conceivable when a workpiece 27, 28 is gripped by the lifting hook 53 as a rough piece and lifted, for example, into a tooling machine, but later, as a finished part, forms a sharply shouldered shaft 54. In this case, additional supporting jaws 33 are positioned as desired on the external splines 32. After the sharply shouldered shaft 54 is set down, the lifting hooks 53 are used to push the parts together on the workpiece carrier.

Instead of an external spline bore 31 a with an external spline 32, other profiles securing against turning or, for stepless setting, round rods with suitable clamping mechanisms can be used. With the described gripping elements 7a, all parts that come into contact with the gripped workpiece 27, 28 or 54 are quickly exchangeable as parts subject to wear. The materials used in these parts are selected so that even workpieces 27, 28 or shafts 54 with a high surface quality are not damaged during handling.

The described gripping elements 7a can also be used in a modified form, e.g., when extremely short workpieces 27, 28 or shafts 54, disks, rolls or wheels are to be handled.

As further alternatives for disk-shaped workpieces, gripping elements 35 as shown in FIGS. 10 and 11 are provided. The clamping prism 37 is mounted on the gripping element 35 so as to be swingable around bolt 36. The clamping prism 37 encompasses the gripping element 35 in a U-shaped fashion. A tension spring 38 is attached to the gripping element 35 and to the clamping prism 37 in such a manner that the clamping prism 37 is always swung into a position of congruence with the gripping element 35. In this swung position, spring-mounted balls 39 in the clamping prism 37 click into corresponding bores 35a in the gripping element 35. This catching mechanism and the tension spring 38 ensure that the clamping prism 37 swings in the direction of the glide foot 29 only after there is a certain load on the tip 37a of the clamping prism 37. The load threshold is designed so that the clamping prism 37 swings only after the locking mechanism in the basic module as per FIG. 3 has fixed the gripping elements 35 in place. During swinging, a workpiece 27, 28 or a disk-shaped workpiece 27; 28 located between the gripping elements moves, at a maximum, by the amount "s" toward the glide foot 29 and therefore sinks downward by the amount "T". Because the load always lies outside of the rotational axis on the tip 37a of the clamping prism 37, the contact surface 37b is also pressed at the same time toward the workpiece 27, 28 or the shaft 54. As a result, the gripping elements 35 always lie securely at three points on the workpiece 27, 28 or the shaft 54 and prevent tilting in the case of disk-shaped workpieces. When the workpiece 27, 28, 54 is set down, the tension spring 38 always brings the clamping prism 37 back to the arrested initial position. The large lift of the rods 4 in the so-called basic module here results only in the setting of the gripping elements to many different workpiece sizes, and the clamping of the workpieces 27, 28 and 54 is achieved by means of the swingable clamping prism 37.

As shown in FIG. 11, the gripping elements 35 are very narrow when seen from the side, so that even the workpieces 27, 28, which consist of narrow disks, remain accessible from both sides. The gripping principle is similarly applicable to shafts 54. The shafts 54 are thereby secured against axial slippage.

In the case of shafts 54 or disk-shaped workpieces 27, 28, the gripping elements 7a, 35 are always pushed from the outside over the workpiece in question. However, there are also many applications where workpieces 27, 28 must be gripped from the inside, in an interior bore or any desired opening. These cases occur, for example, in the handling of plastic containers.

Figure 12:
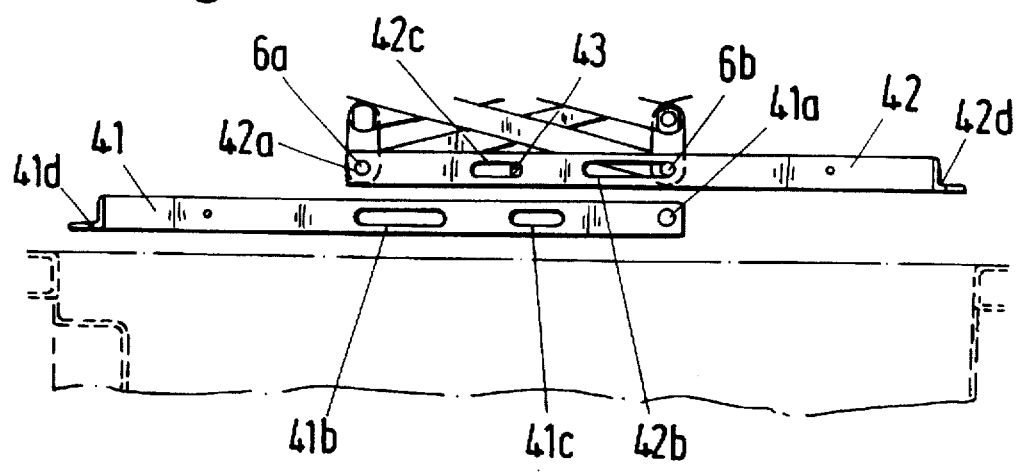
FIG. 12 is a front view of an alternative embodiment for gripping containers.
Figure 13:
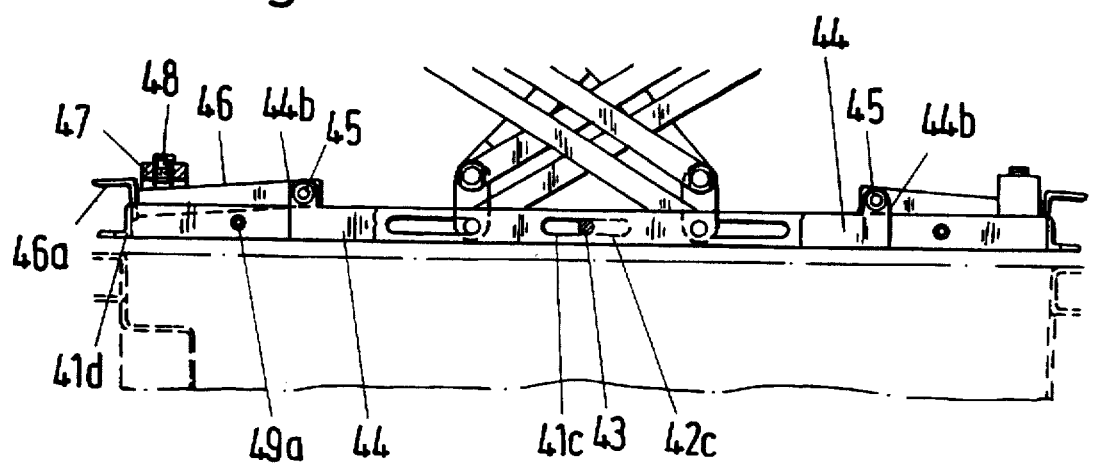
FIG. 13 shows the alternative embodiment of FIG. 12, with further additional parts.
Figure 14:
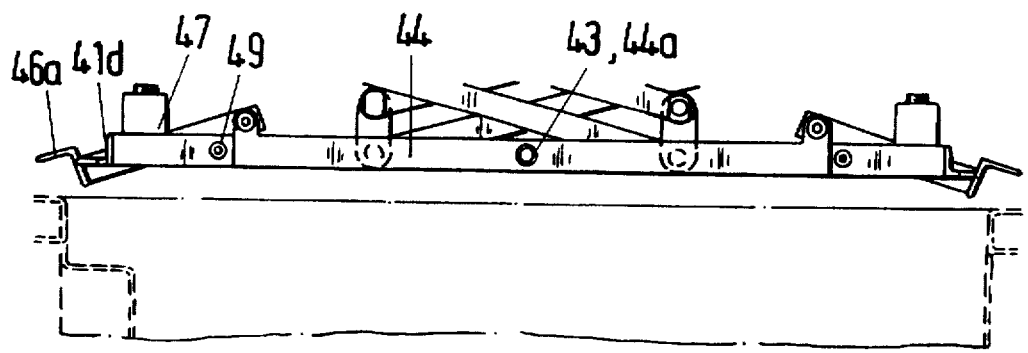
FIG. 14 shows the embodiment of FIGS. 12 and 13 in an attached position.

An example for such a case is described in FIGS. 12 to 14. The rods 4 accommodate at their lower hinge-bolts 6a, 6b, gripping strips 41, 42 in receptacle bores 41a, 42a. The gripping strips 41, 42 are arranged in mirrored and overlapping fashion. In addition, for guidance, the gripping strips 41, 42 have slots 41b, 42b in which the lower hinge-bolts 6a, 6b located respectively across from the receptacle bores are arranged. The distance of these slots 41b, 42b to the bores 41a, 42a determines which of the lift ranges of the basic module will be used. The length of these slots 41b, 42b can be used to limit the lift of the gripping strips 41, 42. When the apparatus is adjusted to a certain workpiece 27, 28, e.g., a certain container, it is not advantageous to utilize the entire large lift of the basic module. The greater this lift is, the greater also is the structural height of the device with the gripped workpiece 27, 28. The gripping strips 41, 42 are also provided with slots 41c, 42c. These slots are arranged in such a manner and are of such a size that when the two slots 41c, 42c overlap in the final positions of the gripping strips, a bolt 43 inserted through both slots is always positioned centrally between the hinge-bolts 6a, 6b. The bolt 43 extends further through a bore 43a of a centering frame 44. In the final positions of the gripping strips, the centering frame 44 is thus always centrally aligned. The centering frame 44 also has an elevation 43b on its respective ends. The elevation 44b becomes thicker toward the rear, lies on the gripping strips and extends past the latter to the rear. The elevations 44b are provided with bores to accommodate screws 45. Centering levers 46 are mounted swingably and secured against axial movement on these screws 45, in the rear, at the free end.

The swinging range of the centering levers 46 is limited upwardly by a bracket 47 attached to each gripping element 7a and by a ball thrust screw 48, and is limited downwardly by a stud 49a attached to the gripping strip by a screw 49. The stud 49a extends thereby below the centering levers 46. As shown in FIGS. 13 and 14, the centering levers 46 have angular contact elements 46a on the free ends. The gripping strips 41, 42 are also provided at the free ends with singular grip pieces 41d, 42d.

When the apparatus is open, as in FIG. 14, the gripping strips 41, 42 are always pushed toward the center of the apparatus, relative to the centering levers 46. When the apparatus is lowered onto a container edge, it is centered relative to the container in the longitudinal direction. As this is done, the grip pieces 41d, 42d are passed over the container edge without hitting it, via the angular contact elements 46a of the swingable centering levers 46. The apparatus is lowered until the contact elements 46a lie on top of the container edge and the centering levers 46 rest under the ball thrust screws 48. In this state, the gripping elements 7a also dip into the container. In the case of stacked containers, the smooth lower edge of the gripping strips 41, 42 also serves here to control the loading height. In the event that the operating lever 3a on the basic module is swung in the direction of the apparatus center, the gripping strips 41, 42 initially move, when the apparatus is subsequently lifted up, only horizontally to the outside. Advantageously, on the back side of the apparatus, another, second pair of gripping strips can be arranged as described. In this case, the angular grip pieces 41d, 42d, which are thus also present in pairs, form a broad support surface, which extends under suitable gripping or holding means of the container. These support surfaces can be narrowed toward the outside. If this is done, then the apparatus also laterally centers itself when the gripping strips 41, 42 are moved apart via the narrowing of the support surfaces in the holding or gripping elements of the container. The gripping elements 7a or the gripping strips 41, 42 are not lifted up until they have been moved so far that the vertical legs of the angular grip pieces 41d, 42d lie on the container handle from the inside. In this phase, the horizontal legs of the grip pieces 41d, 42 lie under the container handles and lift these up. When the load is picked up, the gripping strips 41, 42 are fixed in place by the basic module; the container handles cannot be pushed apart then, even in the case of heavy loads. In this state, the container handles are surrounded on three sides by the angular grip pieces 41d, 42d and the angular contact elements. The distance of the grip pieces 41d, 42d, which are arranged in pairs, is adjusted to the width of the container handle. As a result, it is not possible for the container to shift or fall, even when there are movable contents. The grip pieces 41d, 42d and the centering levers 46 do not extend over the container edge. The centering levers 46 prevent the grip pieces 41d, 42d from remaining caught below the container handles when the opened apparatus is lifted up.

Figure 15:
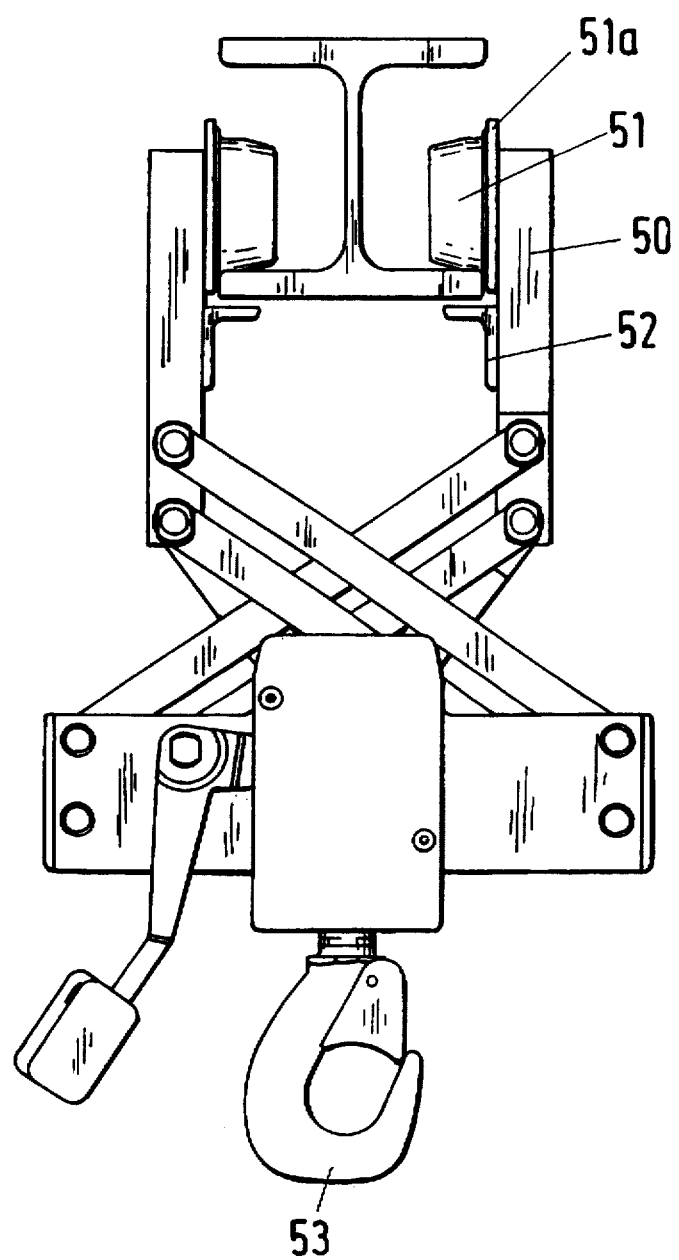
FIG. 15 illustrates use of the inventive device as a folding undercarriage for guide bars.

A further alternative of the device is shown in FIG. 15. In this example, the gripping elements 7a are represented by roller holders 50 and running rollers 51. This example indicates that the device can be used as a folding undercarriage. The great lift of the device permits combination with different profiles, i.e., bar cross-sections. It is especially advantageous that the running rollers 51, located opposite one another, adjust to the bar width. This effect permits the use of running rollers 51 with a guideway band 51a. In this design, additional rollers for lateral guidance are not necessary. The middle web of the bar profile thus remains free and can also be equipped with additional ribbing, or installation conduits can be laid in the interior space. As required, the running rollers 51 can also be arranged in pairs, for example, one behind the other. Height-adjustable stops 52 prevent disproportionate tilting in the case of skewed traction.

Instead of the coupling neck 2a (cf. FIG. 1), a lifting hook 53 is provided here. In the event that the undercarriage is combined, for example, with a pulley block, it is possible during assembly work to quickly establish a transport segment with the functions of lifting or lowering and moving on the horizontal.

The invention is not limited by the embodiments described above which are presented as examples only but can be modified in various ways within the scope of protection defined by the appended patent claims.

We claim:

1. An apparatus for gripping and weight-dependent clamping of workpieces, comprising:

a carrying frame having a guide slot; upper pairs of hinge-bolts mounted on the carrying frame;

pairs of parallel rods having an upper end connected to the upper pairs of hinge-bolts;

connection pieces;

pairs of lower hinge-bolts that connect a lower end of the parallel rods to the connection pieces;

gripping elements connected to the connection pieces, the gripping elements being configured so that a distance relative to one another in an end position is dependent upon an effective length and position of the guide slot;

a pair of struts, each strut being linked at a lower end to a lower hinge-bolt; and a control bolt centrally adjustable between the rods in the guide slot in the carrying frame, the struts being mounted in an articulated manner on the control bolt.

2. An apparatus as defined in claim 1, and further comprising a quick-change mechanism with a coupling neck, which quick-change mechanism is coupleable into a receptacle of a control switch.

3. An apparatus as defined in claim 1, and further comprising a handle including an operating lever attached to the carrying frame.

4. An apparatus as defined in claim 1, and further comprising control means arranged centrally between the rods, and including a locking mechanism.

5. An apparatus as defined in claim 4, wherein the locking mechanism is operative to arrest the control bolt in a plurality of positions in the guide slot.

6. An apparatus as defined in claim 4, and further comprising a block, the control bolt being connected to the block so that a slight crosswise movement of the block is possible, a fine toothing being provided externally on the block in a direction of the guide slot, and still further comprising a bar arranged on the carrying frame and having a toothing corresponding to and running parallel to the block toothing.

7. An apparatus as defined in claim 6, wherein a guide slot is arranged in the block for accommodating the control bolt one of vertically and crosswise to a course of the guide slot.

8. An apparatus as defined in claim 6, and further comprising spring-mounted clamping bolts arranged in pairs in the block at a right angle to a course of the guide slot so as to decouple the block from the bar toothing.

9. An apparatus as defined in claim 6, wherein the bar has a level glide surface parallel and adjacent to the bar toothing.

10. An apparatus as defined in claim 6, and further comprising:

a saddle-like part arranged in a longitudinally movable manner on the carrying frame;

a leg connected to the saddle-like part and having obliquely upwardly running slots; and guide bolts attached to the carrying frame so as to run in the leg slots.

11. An apparatus as defined in claim 10, and further comprising tension spring means, including pairs of tension springs, for causing the saddle-like part and the leg to unlock the control bolt when there is no load.

12. An apparatus as defined in claim 10; and further comprising carrying screws arranged to pass through the carrying frame and fixed in the saddle-like part so as to limit a path of movement of the saddle-like part.

13. An apparatus as defined in claim 10 and further comprising means for activating the locking mechanism, the activating means including a handle connected to an operating lever, the operating lever being mounted to the carrying frame so as to be swingable around a rotational axis and having a take-along pin, the activating means further including a slider mounted movably on the carrying frame and having slots that run obliquely upward, the slider having a further slot in which the take-along pin is arranged.

14. An apparatus as defined in claim 13; wherein the guide bolts are arranged in the oblique slider slots so as to hold the slider movably relative to the carrying frame.

15. An apparatus as defined in claim 13, and further comprising a leaf spring having a heel and being attached to the saddle-like part so that the heel lies on the operating lever.

16. An apparatus as defined in claim 13, wherein the operating lever has an outer lever arm, and further comprising spring-mounted sphere means mounted on the bar for arresting the outer lever arm.

17. An apparatus as defined in claim 1, wherein the gripping elements have a rigid gripping prism.

18. An apparatus as defined in claim 17 wherein the gripping prism includes an outer part having a glide foot with an anti-slip cover and a separate shoulder so as to facilitate quick opening upon lowering.

19. An apparatus as defined in claim 17, wherein the gripping prism includes an outer part with an auxiliary load support member having a support protrusion directed toward a particular workpiece.

20. An apparatus as defined in claim 1, wherein the gripping elements have a self-adjusting gripping prism.

21. An apparatus as defined in claim 20, wherein the self-adjusting gripping prism has an outer part, a load support member attached at an end of the outer part, and a hold-down appliance having a stud and located approximately opposite thereto, a holder is arranged movably on the rods and has a bore that accommodates the stud of the hold-down appliance.

22. An apparatus as defined in claim 20, wherein the gripping prism includes an outer part having a glide foot with an anti-slip cover and a separate shoulder so as to facilitate quick opening upon lowering.

23. An apparatus as defined in claim 20, wherein the gripping prism includes an outer part with an auxiliary load support member having a support protrusion directed toward a particular workpiece.

24. An apparatus as defined in claim 1, wherein at least one of the gripping elements includes a gripping arm, a bolt at an end of the gripping arm, and a clamping prism pivotally mounted on the bolt, and further comprising spring means for mounting the clamping prism on the bolt in a back-swingable fashion.

25. An apparatus as defined in claim 1, wherein the gripping elements have, opposite-to the lower hinge-bolts, an externally splined bore, an external spline being arranged in the splined bore, and further comprising at least one of a support jaw and at least one lifting hook arranged on the external spline.

26. An apparatus as defined in claim 25, wherein the gripping.elements include a lifting hook having a bent arm and mounted swingably on the external spline, and means for limiting swinging movement of the hook and means for preventing an axial movement.

27. An apparatus as defined in claim 1, wherein the gripping elements include gripping strips that are adjustable relative to one another on a plane and are connected to the connection piece by the lower hinge bolts, and a centering frame mounted to the gripping strips.

28. An apparatus as defined in claim 27, and further comprising centering levers swingably mounted on respective end regions of the centering frame and secured against axial movement.

29. An apparatus as defined in claim 1, and further comprising roller holders with rotary-mounted running rollers mounted on the connection pieces.

* * * * *